United States Patent
Jetcheva et al.

(10) Patent No.: US 9,602,399 B2
(45) Date of Patent: Mar. 21, 2017

(54) UTILIZING MULTIPLE MESH NETWORK GATEWAYS IN A SHARED ACCESS NETWORK

(71) Applicant: Firetide, Inc., Campbell, CA (US)

(72) Inventors: Jorjeta Gueorguieva Jetcheva, Los Gatos, CA (US); Sachin Kanodia, San Jose, CA (US); Murali Sundaramoorthy Repakula, San Jose, CA (US); Sivakumar Kailas, San Jose, CA (US)

(73) Assignee: Firetide, Inc., Campbell, CA (US)

( * ) Notice: Subject to any disclaimer, the term of this patent is extended or adjusted under 35 U.S.C. 154(b) by 0 days.

(21) Appl. No.: 14/046,950

(22) Filed: Oct. 5, 2013

(65) Prior Publication Data
US 2015/0110104 A1    Apr. 23, 2015

Related U.S. Application Data

(63) Continuation of application No. 12/018,152, filed on Jan. 22, 2008, now Pat. No. 8,559,447, which is a
(Continued)

(51) Int. Cl.
*H04L 12/28* (2006.01)
*H04L 12/721* (2013.01)
(Continued)

(52) U.S. Cl.
CPC ............ *H04L 45/44* (2013.01); *H04L 45/124* (2013.01); *H04L 45/22* (2013.01); *H04L 47/125* (2013.01);
(Continued)

(58) Field of Classification Search
CPC .................................................... H04W 84/22
See application file for complete search history.

(56) References Cited

U.S. PATENT DOCUMENTS

| 6,314,126 B1 | 11/2001 | Schilling et al. |
| 6,363,319 B1 | 3/2002 | Hsu |

(Continued)

FOREIGN PATENT DOCUMENTS

| CN | 1561624 A | 1/2005 |
| CN | 101243662 B | 6/2014 |

(Continued)

OTHER PUBLICATIONS

Intellectual Property India, India Application No. 1145/DELNP/2008, First Examination Report, Oct. 13, 2015, 2 pages (English Only).

(Continued)

*Primary Examiner* — John Blanton
(74) *Attorney, Agent, or Firm* — PatentVentures; Bennett Smith; Korbin Van Dyke

(57) ABSTRACT

A mesh network, operating as a virtual Ethernet switch, includes multiple nodes operating as Mesh Network Gateway Interfaces (mesh NGIs) enabled for communication with one or more shared access networks. Selectively coupling the multiple NGIs to the same shared access network provides redundancy and load balancing aimed at improving the reliability and performance of the network. A first architecture is based on a gateway group, including a plurality of NGIs enabled to communicate with a single shared access network via a designated broadcast server elected from among the NGIs. A second architecture is based on a plurality of (physical) NGIs enabled to communicate with a single shared access network via one or more designated nodes in the shared access network. The designated nodes, or Mesh Servers (MSs), operate as virtual NGIs, and traffic entering or exiting the mesh flows through one of the MSs, thus improving packet broadcast efficiency.

20 Claims, 7 Drawing Sheets

Related U.S. Application Data continuation-in-part of application No. PCT/US2006/028903, filed on Jul. 26, 2006.

(60) Provisional application No. 60/704,528, filed on Jul. 30, 2005, provisional application No. 60/708,131, filed on Aug. 13, 2005, provisional application No. 60/709,738, filed on Aug. 19, 2005, provisional application No. 60/806,519, filed on Jul. 3, 2006.

(51) Int. Cl.

| | |
|---|---|
| H04W 84/22 | (2009.01) |
| H04W 88/16 | (2009.01) |
| H04L 12/707 | (2013.01) |
| H04L 12/803 | (2013.01) |
| H04L 12/24 | (2006.01) |
| H04W 40/00 | (2009.01) |

(52) U.S. Cl.
CPC ........... *H04W 84/22* (2013.01); *H04W 88/16* (2013.01); *H04L 41/0654* (2013.01); *H04W 40/00* (2013.01)

(56) References Cited

U.S. PATENT DOCUMENTS

| | | | |
|---|---|---|---|
| 6,493,377 | B2 | 12/2002 | Schilling et al. |
| 6,512,784 | B2 | 1/2003 | Schilling |
| 6,778,495 | B1 | 8/2004 | Blair |
| 6,781,953 | B1 | 8/2004 | Naouri |
| 6,842,460 | B1 | 1/2005 | Olkkonen et al. |
| 6,879,574 | B2 | 4/2005 | Naghian et al. |
| 7,031,293 | B1 | 4/2006 | Srikrishna et al. |
| 7,167,503 | B2 | 1/2007 | Schilling et al. |
| 7,187,706 | B2 | 3/2007 | Schilling et al. |
| 7,768,926 | B2 | 8/2010 | Bellur et al. |
| 8,559,447 | B2 | 10/2013 | Jetcheva et al. |
| 2001/0040895 | A1 | 11/2001 | Templin |
| 2002/0012320 | A1 | 1/2002 | Ogier et al. |
| 2002/0042274 | A1 | 4/2002 | Ades |
| 2002/0062388 | A1 | 5/2002 | Ogier et al. |
| 2002/0114302 | A1 | 8/2002 | McDonald |
| 2003/0095504 | A1 | 5/2003 | Ogier |
| 2003/0189914 | A1 | 10/2003 | Zhao |
| 2003/0235175 | A1 | 12/2003 | Naghian et al. |
| 2004/0215687 | A1 | 10/2004 | Klemba et al. |
| 2004/0264379 | A1 | 12/2004 | Srikrishna et al. |
| 2005/0025179 | A1* | 2/2005 | McLaggan et al. .... H04L 45/00 370/468 |
| 2005/0030968 | A1 | 2/2005 | Rich et al. |
| 2005/0166053 | A1* | 7/2005 | Cui et al. ...................... 713/176 |
| 2006/0039286 | A1 | 2/2006 | Basu et al. |
| 2006/0083186 | A1 | 4/2006 | Handforth et al. |
| 2006/0146846 | A1* | 7/2006 | Yarvis et al. ................. 370/406 |
| 2006/0274718 | A1* | 12/2006 | Butenweg et al. ........... 370/351 |
| 2008/0107034 | A1 | 5/2008 | Jetcheva et al. |
| 2008/0112422 | A1 | 5/2008 | Jetcheva et al. |
| 2009/0092143 | A1 | 4/2009 | Schilling et al. |
| 2009/0175169 | A1 | 7/2009 | Kanodia et al. |
| 2009/0175238 | A1 | 7/2009 | Jetcheva et al. |
| 2009/0190531 | A1 | 7/2009 | Jetcheva et al. |

FOREIGN PATENT DOCUMENTS

| | | |
|---|---|---|
| EP | 1566930 A1 | 2/2005 |
| GB | 2442681 A | 4/2008 |
| GB | 2442680 B | 3/2010 |
| GB | 2464229 B | 7/2010 |
| GB | 2465499 B | 8/2010 |
| KR | 101309545 B1 | 9/2013 |
| WO | 0243333 A3 | 5/2002 |
| WO | 03049405 A1 | 6/2003 |
| WO | 2004100424 A2 | 11/2004 |
| WO | 2004100425 A2 | 11/2004 |
| WO | 2004100426 A2 | 11/2004 |
| WO | 2004100425 A3 | 2/2005 |
| WO | 2005057834 A2 | 3/2005 |
| WO | 2004100424 A3 | 7/2005 |
| WO | 2004100426 A3 | 5/2006 |
| WO | 2007013914 A1 | 2/2007 |
| WO | 2007015822 A1 | 2/2007 |
| WO | 2007016118 A1 | 2/2007 |
| WO | 2007103837 A1 | 9/2007 |
| WO | 2008036756 A2 | 3/2008 |
| WO | 2008036775 A1 | 3/2008 |
| WO | 2008046089 A2 | 4/2008 |
| WO | 2008036756 A3 | 5/2008 |
| WO | 2008046089 A3 | 6/2008 |
| WO | 2009091739 A2 | 7/2009 |
| WO | 2009094264 A2 | 7/2009 |
| WO | 2009091739 A3 | 10/2009 |
| WO | 2009094264 A3 | 10/2009 |

OTHER PUBLICATIONS

Korean Intellectual Property Office, Korean Application No. 10-2008-7004834, Notice to File a Response, Aug. 8, 2012, 5 pages.

State Intellectual Property Office of P.R.C., P.R.C. Application No. 200680030483.3, Notification of the First Office Action, Aug. 20, 2010, 13 pages.

State Intellectual Property Office of P.R.C., P.R.C. Application No. 200680030483.3, Notification of the Fourth Office Action, May 27, 2013, 20 pages.

Ashish Raniwala and Tzi-cker Chiueh, Architecture and Algorithms of an IEEE 802.11-Based Multi-Channel Wireless Mesh Network, Proceedings IEEE 24th Annual Joint Conference of the IEEE Computer and Communications Societies. vol. 3, pp. 2223-2234, IEEE, Mar. 13, 2005.

UK Intellectual Property Office, "Combined Search and Examination Report under Sections 17 & 18(3)"for related case GB1000071.9 (subsequently granted as GB2465499B); Mar. 22, 2010; 2 pages.

Taiwan Intellectual Property Office, "Search Report" (translation) for related case TW095126421 (subsequently granted as I323110); Apr. 24, 2009, 2 pages.

Jorjeta G. Jetcheva, et al.; Design and Evaluation of a Metropolitan Area Multitier Wireless Ad Hoc Network Architecture; Proceedings of the 5th IEEE Workshop on Mobile Computing Systems and Applications (WMCSA 2003), IEEE, Monterey, CA, Oct. 2003, 12 pgs. cited by other.

David B. Johnson, et al.; The Dynamic Source Routing Protocol for Mobile Ad Hoc Networks; IETF MANET Working Group, Feb. 21, 2002, 85 pgs (pp. i-81). cited by other.

Supratik Bhattacharyya, et al.; Geographical and Temporal Characteristics of Inter-POP Flows: View from a Single POP. European Transactions on Telecommunications (ETT), vol. 13, No. 1. pp. 5-22, Jan./Feb. 2002, 18 pgs. cited by other.

Supratik Bhattacharyya, et al.; POP-Level and Access-Link-Level Traffic Dynamics in a Tier-1 POP. ACM SIGCOMM Internet Measurement Workshop (IMW), San Francisco, Nov. 2001, 15 pgs. cited by other.

Jorjeta G. Jetcheva, et. al.; Adaptive Demand-Driven Multicast Routing in Multi-Hop Wireless Ad Hoc Networks In proceedings of the ACM Symposium on Mobile Ad Hoc Networking and Computing (MobiHoc), Long Beach, CA, Oct. 2001, 12 pgs. cited by other.

Ashwin Sridharan, et al.; On the Impact of Aggregation on the Performance of Traffic-Aware Routing. In proceedings of the 17th International Teletraffic Congress, Salvador da Bahia, Brazil, Sep. 2001, 13 pgs. cited by other.

Nina Taft et al.; Understanding Traffic Dynamics at a Backbone POP. SPIE ITCOM + OPTICOMM Workshop on Scalability and Traffic Control in IP Networks, Denver, CO, Aug. 2001, 7 pgs. cited by other.

Jorjeta G. Jetcheva, et. al.; A Simple Protocol for Multicast and Broadcast in Mobile Ad Hoc Networks, Jul. 20, 2001, 14 pgs. (pp. i-11). cited by other.

(56) References Cited

OTHER PUBLICATIONS

Jorjeta G. Jetcheva, et. al.; The Adaptive Demand-Driven Multicast Routing Protocol for Mobile Ad Hoc Networks, Jul. 13, 2001, 67 pgs. (pp. i-63). cited by other.

David A. Maltz, et al.; The Effects of On-Demand Behavior in Routing Protocols for Multi-Hop Wireless Ad Hoc Networks, IEEE Journal on Selected Areas in Communications Special Issue on Mobile and Wireless Networks, Aug. 1999, 20 pgs. cited by other.

Bhargav Bellur and Richard G. Ogier; A Reliable, Efficient Topology Broadcast Protocol for Dynamic Networks; in IEEE Infocomm, pp. 178-186, IEEE, Mar. 1999. 9 pgs. cited by other.

Josh Broch et al.; A Performance Comparison of Multi-Hop Wireless Ad Hoc Network Routing Protocols. Proceedings of the Fourth Annual ACM/IEEE International Conference on Mobile Computing and Networking, ACM, Dallas, TX, Oct. 1998, 13 pgs. cited by other.

International Search Report and Written Opinion for PCT/US2006/028903; mailed Dec. 5, 2006; 9 pages.

Chao Gui et al. "Efficient overlay multicast for mobile ad hoc networks", In: Wireless Communications and Networking, 2003, WCNC 2003, 2003 IEEE vol. 2, Mar. 16-20, 2003, pp. 1118-1123, 6 pages.

\* cited by examiner

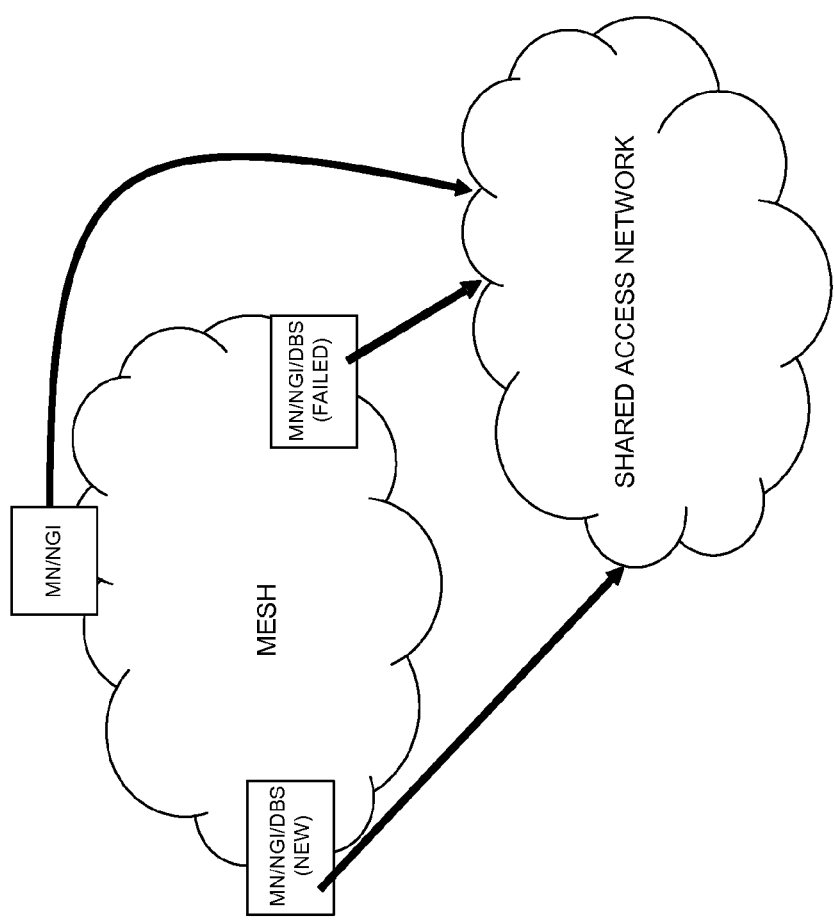

UTILIZING MULTIPLE MESH NETWORK GATEWAYS IN A SHARED ACCESS NETWORK

CROSS REFERENCE TO RELATED APPLICATIONS

Priority/benefit claims for this application are made in the accompanying Application Data Sheet. This application incorporates by reference for all purposes the following applications, which are all owned by the owner of the instant application:
- U.S. Provisional Application Ser. No. 60/704,528, filed Jul. 30, 2005, first named inventor Jorjeta Jetcheva, and entitled Utilizing Multiple Mesh Network Gateways in a Shared Access Network;
- U.S. Provisional Application Ser. No. 60/708,131, filed Aug. 13, 2005, first named inventor Jorjeta Jetcheva, and entitled Utilizing Multiple Mesh Network Gateways in a Shared Access Network;
- U.S. Provisional Application Ser. No. 60/709,738, filed Aug. 19, 2005, first named inventor Jorjeta Jetcheva, and entitled Utilizing Multiple Mesh Network Gateways in a Shared Access Network;
- U.S. Provisional Application Ser. No. 60/806,519, filed Jul. 3, 2006, first named inventor Jorjeta Jetcheva, and entitled Utilizing Multiple Mesh Network Gateways in a Shared Access Network;
- PCT Application Serial No. PCT/US2006/028903, filed Jul. 26, 2006, first named inventor Jorjeta Jetcheva, and entitled Utilizing Multiple Mesh Network Gateways in a Shared Access Network; and
- U.S. Non-Provisional application Ser. No. 12/018,152, filed Jan. 12, 2008, first named inventor Jorjeta Jetcheva, and entitled Utilizing Multiple Mesh Network Gateways in a Shared Access Network.

BACKGROUND

1. Field

Advancements in mesh networks are needed to provide improvements in performance, efficiency, and utility of use. Embodiments described elsewhere herein enable the improvements.

2. Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes. Nothing herein is to be construed as an admission that any of the references are pertinent prior art, nor does it constitute any admission as to the contents or date of actual publication of these documents.

SUMMARY

The invention can be implemented in numerous ways, including as a process, an article of manufacture, an apparatus, a system, a composition of matter, and a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention. An exposition of one or more embodiments of the invention is provided in the Detailed Description. The Detailed Description includes an Introduction to facilitate the more rapid understanding of the remainder of the Detailed Description. The Introduction includes Illustrative Combinations that tersely summarize illustrative systems and methods in accordance with the concepts taught herein. As is discussed in more detail in the Conclusions, the invention encompasses all possible modifications and variations within the scope of the issued claims, which are appended to the very end of the issued patent.

BRIEF DESCRIPTION OF THE DRAWINGS

Various embodiments of the invention are disclosed in the following detailed description and the accompanying drawings.

FIGS. 2A, 2B, and 2C illustrate selected details of an embodiment of a self-healing mesh network having a control protocol for assigning a dedicated broadcast server in each of one or more partitions of the mesh network.

DETAILED DESCRIPTION

Figure 1:
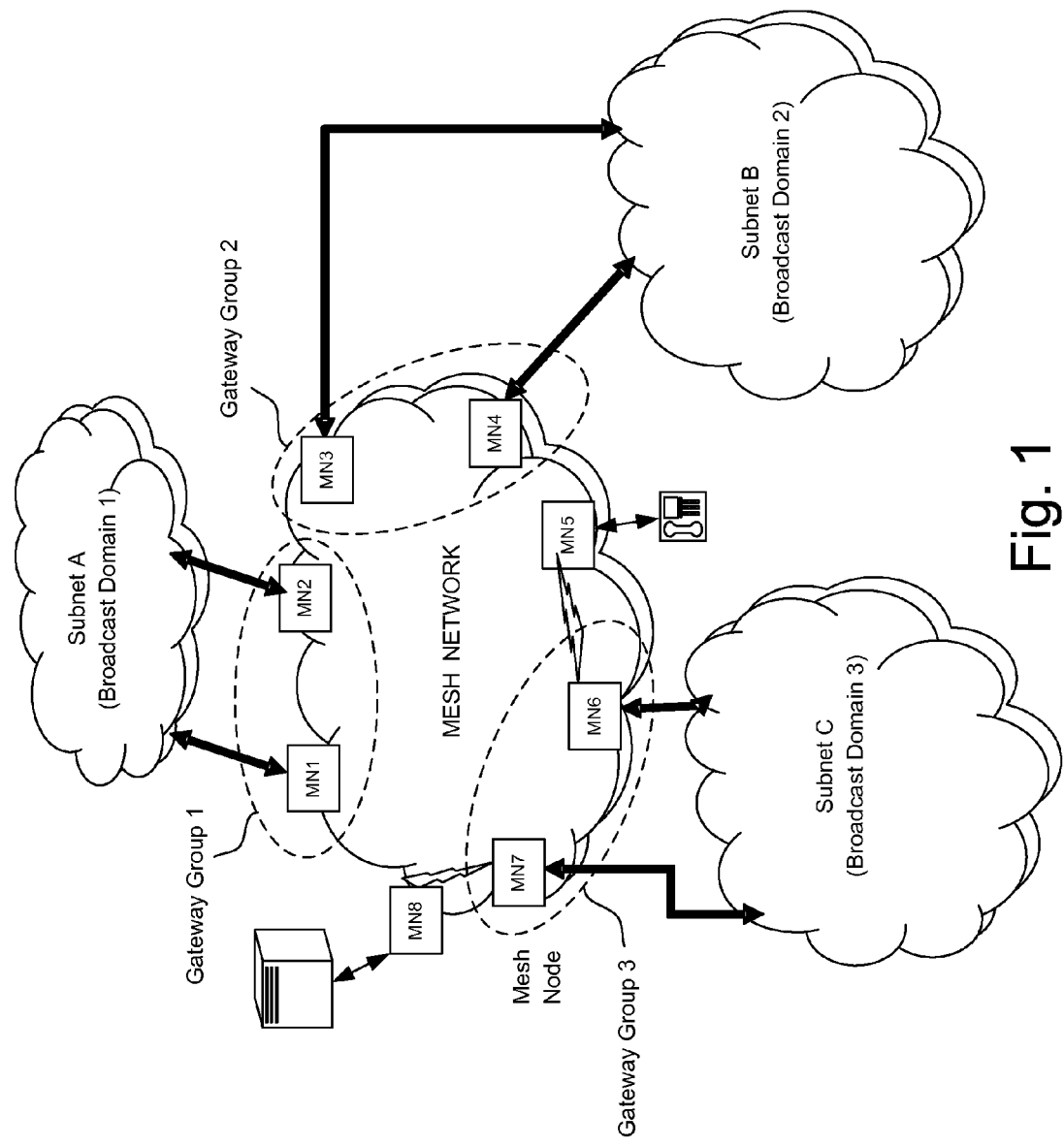
FIG. 1 illustrates selected details of an embodiment of a first architecture of a mesh network having multiple mesh gateway interfaces to multiple shared access networks.

The invention can be implemented in numerous ways, including as a process, an article of manufacture, an apparatus, a system, a composition of matter, and a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

INTRODUCTION

This introduction is included only to facilitate the more rapid understanding of the Detailed Description. The invention is not limited to the concepts presented in the introduction, as the paragraphs of any introduction are necessarily an abridged view of the entire subject and are not meant to be an exhaustive or restrictive description. For example, the introduction that follows provides overview information limited by space and organization to only certain embodiments. There are in fact many other embodiments, including those to which claims will ultimately be drawn, which are discussed throughout the balance of the specification. As is discussed in more detail in the Conclusions, the invention encompasses all possible modifications and variations within the scope of the issued claims, which are appended to the very end of the issued patent.

Various embodiments use a mesh network acting as a virtual Ethernet switch. The mesh network includes multiple nodes operating as mesh Network Gateway Interfaces (mesh NGIs) enabled for communication with one or more shared access networks. Selectively coupling the multiple NGIs to the same shared access network provides redundancy and load balancing aimed at improving the reliability and performance of the network.

A first architecture is based on a gateway group and a designated broadcast server. A gateway group includes a plurality of NGIs enabled to communicate with a single shared access network. Members of the gateway group inter-communicate via a coordinating distributed protocol. A designated broadcast server from among the NGIs is elected by the NGIs to control entrance of broadcast packets into the mesh network from the shared access network. All other NGIs of the gateway group ignore broadcast packets from the shared access network, thus improving packet broadcast efficiency and reducing or eliminating the possibility of broadcast loops.

A second architecture is based on a plurality of (physical) NGIs enabled to communicate with a single shared access network via a designated node in the shared access network. The designated node, or Mesh Server (MS), executes a mesh routing protocol, operating as a virtual NGI, and traffic entering or exiting the mesh flows through the MS, thus improving packet broadcast efficiency. The physical NGIs are operated with virtual mesh links to the MS. The virtual mesh links may be implemented as point-to-point tunnels. Embodiments according to the second architecture may be operated with a plurality of single shared access networks, each of the shared access networks having a respective designated MS operating as a virtual NGI.

Embodiments taught herein are specifically designed for mesh networks, and conserve limited bandwidth and computation resources, in contrast to solutions used for wired networks that generally treat bandwidth and computation resources as plentiful. For example, a Spanning Tree Protocol (STP) is often used in contexts having multiple interfaces/devices connected to a shared access network. STP blocks all but one interface/device (i.e. packets are not forwarded) and thus removes any possibility of forwarding loops among the interfaces to the shared network. As a result, however, STP also eliminates potential benefits of the multiple interfaces (such as load balancing and redundancy). For another example, throughput to a shared access network may be improved by link aggregation. However, conventional link aggregation is restricted to port aggregation on a single physical device, while multiple mesh network couplings to a shared access network are on different physical devices, as each coupling is physically (and often geographically) distinct. In some embodiments geographical separation is used to reduce or eliminate interference between wireless communications. In some embodiments separation is used to reduce interfering communication paths traveled by traffic within the mesh.

Various embodiments use a mesh network acting as a virtual Ethernet switch (operating as a layer-2 switch). The mesh network may also further include multiple mesh NGIs that connect to one or more shared access networks. Selectively connecting the multiple NGIs to the same shared access network provides redundancy and load balancing aimed at improving the reliability and performance of the network. If more than one NGI is coupled to the same shared access network, then there exists a possibility of forwarding broadcast packets in loops, unnecessarily consuming network resources. Some embodiments detect possible loop forwarding and reduce or prevent the forwarding loops.

When multiple mesh NGIs are connected to the same shared access network, some destinations on the shared access network are learned through one NGI and some through others. Inefficient use of the limited mesh resources may result when a better path becomes available inside the mesh to destinations on the shared access network, for example via a different NGI than one currently in use, but the better path is not yet known. In some embodiments traffic rerouting is provided to the NGI in the shared access network to which a source node has the best path even as path metrics change and different paths have the best metric at different times.

In some embodiments the best path is associated with a metric such as hop-count, and the best path is a route having the smallest hop-count. Other metrics for best path determination may be used based on implementation dependent criteria, as the techniques discussed elsewhere herein are independent of best path determination details.

As an example usage scenario, consider a mesh network deployed in a resort such that users access the mesh network wirelessly on the grounds of the resort. Traffic is forwarded via the mesh network to a central office of the resort having a wired connection to the Internet. The wired network includes several NGIs to avoid concentrating all traffic onto a single NGI (load balancing) and also for improved reliability (redundancy/failover). Thus the multiple NGIs enable relatively higher bandwidth operation and relatively improved availability.

Mesh Network Concepts

Mesh Network Concept No. 1: Without special mechanisms in place, having multiple mesh NGIs connected to a single shared access network may cause broadcast loops, whereby a broadcast packet forwarded from the mesh network to the shared access network by one NGI would be forwarded back into the mesh by another NGI. Broadcast loops waste network resources, and may congest the network to be unable to deliver any useful data. Packets may also not be routed appropriately because the NGI/Client Interfaces may receive conflicting ideas as to whether a destination is inside or outside the mesh. For example, when an interface hears a packet on the shared access network, the interface assumes that the source of the packet is on the shared access network rather than on the mesh, even though the packet may have been forwarded from the mesh by another interface and the packet source is in or is reachable through the mesh.

Mesh Network Concept No. 2: When there are multiple mesh NGIs onto a single access network, it would be inefficient for all of the NGIs to forward a packet received on the shared access network into the mesh. Multiple forwarding is exacerbated when the destination of the packet is unknown, causing the NGI to flood (rather than unicast)

the packet into the mesh. Having multiple floods of the same packet within the mesh, each generated by a different NGI, would be wasteful of network resources. To avoid inefficiency, coordination is used so that only one mesh NGI forwards each packet from the shared access network into the mesh.

Mesh Network Concept No. 3: For best performance and most efficient use of resources, packets need to take the best currently available paths within the mesh for a given source and destination of traffic.

Terms

Elsewhere herein terms are used to describe selected elements and aspects of various embodiments and implementations. Examples for selected terms follow.

Node: An example of a node is an electronic device.

Packet: An example of a packet is that nodes communicate information to each other that is subdivided into packets.

Link: An example of a link is a conceptual representation of the ability of two (or more) nodes to communicate with each other. A link may be wired (the nodes being connected by a physical medium for carrying information such as electrical or optical interconnect) or wireless (the nodes being connected without a physical medium, e.g., via radio technology).

Path/Route: An example of a path/route is a sequence of one or more links.

Path Metric: An example of a path metric is a number that reflects the desirability of a path. For example, the number of links, e.g., the hop count of a path, is one possible metric. Paths with a lower hop count have advantages over paths with a higher hop count. The advantages include less resource usage (as there is reduced forwarding) and less likelihood of lost packets (as there are fewer chances for loss before packets reach respective destinations).

Best Path: An example of a best path is an ordered list of nodes that when transited (in order) by a packet result in an efficient traversal from a source to a destination, according to predetermined criteria. Since parameters and operating conditions vary over time, any best path is also a "known" best path; e.g. it is based on criteria evaluated at a particular point in time, and at a different point in time a different best path may be available. Best paths may also be considered to be "most nearly optimal" according to one or more metrics as measured with respect to a routing protocol responsible for determining the best paths.

Network: An example of a network is a set of nodes that are enabled to communicate with each other via any combination of wired and wireless links.

Mesh Network: An example of a mesh network is a set of nodes that self-organize into a multi-hop network. In some usage scenarios the mesh network has limited resources (e.g. available bandwidth, available computational power, and available energy).

Multi-Mesh Network: An example of a multi-mesh network is a set of interconnected meshes appearing to operate as a single network from a perspective of a user of resources provided by the multi-mesh network.

Shared Access Network: An example of a shared access network is a network such that a packet transmitted by any node is overheard by all other nodes in the network. An example implementation of such a network is an 802.3 LAN.

Ingress Mesh: An example of an ingress mesh is a mesh where a packet enters a multi-mesh.

Egress Mesh: An example of an egress mesh is a mesh where a packet exits (or leaves) a multi-mesh.

Ingress Mesh Node: An example of an ingress mesh node is a node where a packet enters a mesh; e.g. the node forwarding the packet from a non-mesh link onto a mesh link/network.

Egress Mesh Node: An example of an egress mesh node is a node where a packet exits a mesh; e.g. the node forwarding the packet from a mesh link onto a non-mesh link/network.

Mesh Bridge (Node): An example of a mesh bridge is a node that is simultaneously participating in more than one mesh network at a time; e.g. the node is coupled to at least two mesh networks at once. Bridge nodes enable nodes connected on a first mesh (or that are part of the first mesh) to communicate with nodes connected on a second mesh (or that are part of the second mesh).

(Mesh) Bridge Link: An example of a mesh bridge link is a link between two bridge nodes (each being coupled to a respective mesh) used to forward traffic between the two meshes.

Ingress Bridge Node: An example of an ingress bridge node is the mesh bridge where a packet exits (or leaves) an ingress mesh.

Egress Bridge Node: An example of an egress bridge node is the mesh bridge where a packet enters an egress mesh.

Mesh Portal: An example of a mesh portal is a node that is part of a mesh network and is also connected to another (shared access) network. Mesh portals enable nodes connected to the mesh, or that are part of the mesh, to communicate with nodes that are part of the shared access network, or that may be reached through the shared access network. In some embodiments the mesh network appears to outside networks as a transparent layer-2 transport, i.e. a packet injected into the mesh at one portal exits the mesh at another portal unmodified.

Ingress Mesh Portal: An example of an ingress mesh portal is the portal at which a packet enters a mesh, e.g., the portal that forwards the packet from a non-mesh link/network onto a mesh link/network.

Egress Mesh Portal: An example of an egress mesh portal is the portal at which a packet exits the mesh, e.g., the portal that forwards the packet from a mesh link/network onto a non-mesh link/network.

Mesh Client Interface: An example of a mesh client interface is an interface (that is part of a node of a mesh network) for coupling to a client device.

Mesh Network Gateway Interface (mesh NGI): An example of a mesh NGI is a node that is part of a mesh network (e.g., has an interface configured to be part of the mesh network) and is also connected to another network (e.g., has an interface configured to be on the other network). Mesh NGIs enable nodes connected to a mesh network, or that are part of the mesh, to communicate with nodes that are part of a shared access network, or that may be reached through the shared access network. In some embodiments the mesh network appears to outside networks as a transparent layer 2 transport: a packet injected into the mesh at one NGI exits the mesh at another NGI or Client Interface unmodified.

Ingress Mesh Interface: An example of an ingress mess interface is an interface at which a packet enters a mesh, e.g., the interface that forwards the packet from a non-mesh link onto a mesh link/network.

Egress Mesh Interface: An example of an egress mesh interface is the interface at which a packet exits the mesh, e.g., the interface that forwards the packet from a mesh link onto a non-mesh link/network.

Unicast: An example of unicast is communication between two nodes.

Broadcast: An example of broadcast is communication from one node intended to reach a plurality of nodes. In some usage scenarios the plurality of nodes includes all nodes on a network. In some scenarios a broadcast may not reach all intended nodes (due to packet loss, for example).

Flood: An example of a flood is a broadcast sent by a node that is in turn rebroadcast by every other node receiving the broadcast, thus potentially reaching all nodes in a network.

Routing Protocol: An example of a routing protocol is a set of mechanisms implemented on each node in a mesh network, wherein the mechanisms serve to discover information about the network and enable each node on the network to communicate with other nodes of the network, even when the other nodes are multiple hops away from the respective node.

Path Accumulation: An example of path accumulation is when each node forwarding a packet adds its respective address to the packet.

Illustrative Combinations

The following is a collection of paragraphs that tersely summarize illustrative systems and methods in accordance with the concepts taught herein. Each of the paragraphs highlights various combinations of features using an informal pseudo-claim format. These compressed descriptions are not meant to be mutually exclusive, exhaustive, or restrictive and the invention is not limited to these highlighted combinations. As is discussed in more detail in the Conclusion section, the invention encompasses all possible modifications and variations within the scope of the issued claims, which are appended to the very end of the patent.

A method for connecting at layer 2 a mesh or ad hoc network to a wired shared access network through multiple mesh gateways (nodes that are both on the mesh and on the shared access network), such that no forwarding loops are formed, and wherein the first architecture (described elsewhere herein) is used.

A method for connecting at layer 2 one or more wired shared access networks to each other through a mesh network, such that each shared access network has multiple gateways onto the mesh network, such that no forwarding loops are formed, and wherein the first architecture (described elsewhere herein) is used.

A method for connecting at layer 2 a mesh or ad hoc network to a wired shared access network through multiple mesh gateways (nodes that are both on the mesh and on the shared access network), such that no forwarding loops are formed, and wherein the second architecture (described elsewhere herein) is used.

A method for connecting at layer 2 one or more wired shared access networks to each other through a mesh network, such that each shared access network has multiple gateways onto the mesh network, such that no forwarding loops are formed, and wherein the second architecture (described elsewhere herein) is used.

A method for automatic rerouting of traffic within a mesh from one mesh gateway in a wired shared access network to another mesh gateway in another wired shared access network connected to the mesh such that the best path within the mesh is used for forwarding traffic between any two shared access networks. The foregoing method implemented according to at least one of the first architecture (described elsewhere herein) and the second architecture (described elsewhere herein).

A first embodiment comprising a method comprising communicating packet data between a self-organizing network and a shared access network via a group of network interface nodes, each node being a member of the self-organizing network and having a respective communication link with the shared access network; enabling network performance improvements; and wherein the network performance improvements comprise at least one of preventing broadcast loops between the self-organizing network and the shared access network, avoiding forwarding of more than one copy of a packet from the shared access network onto the self-organizing network, and routing a packet that specifies a source and a destination via a best path within the self-organizing network according to the source and the destination. The aforementioned embodiment further comprising executing a control protocol to enable the network performance improvements.

The first embodiment wherein the shared access network is a wired network. The first embodiment wherein the communicating is in accordance with a traffic splitting operation. The foregoing embodiment wherein the traffic splitting operation is in accordance with a load-balancing objective. The first embodiment wherein the communicating comprises splitting traffic communicated between an endpoint accessible via the self-organizing network and an endpoint accessible via the shared access network between at least two of the communication links. The first embodiment wherein the communicating comprises splitting traffic communicated between an endpoint in the self-organizing network and an endpoint accessible via the shared access network between at least two of the communication links. The foregoing embodiment wherein the at least two of the communication links are terminated at distinct devices of at least one of the self-organizing network and the shared access network.

The first embodiment wherein the communicating is in accordance with a failure recovery operation. The foregoing embodiment wherein the failure recovery operation comprises shifting traffic communicated between an endpoint in the self-organizing network and an endpoint accessible via the shared access network from a first one of the communication links to a second one of the communication links when the first one of the communication links fails. The foregoing embodiment wherein the first one and the second one of the communication links are terminated at distinct ports of at least one of the self-organizing network and the shared access network.

The first embodiment wherein the group of network interface nodes is a gateway group, and each of the network interface nodes operates as a respective network gateway interface; the control protocol is a distributed control protocol executed on the gateway group; and the distributed control protocol comprises communicating control information between the network gateway interfaces. The foregoing embodiment comprising communicating data between the self-organizing network and another shared access network via another gateway group. The foregoing embodiment wherein each of the gateway groups are identified by unique gateway group identifiers.

The first embodiment wherein the group of interface nodes is a gateway group communicating control information between each other via a distributed coordination protocol. The foregoing embodiment wherein the coordination protocol comprises selecting a member of the gateway group as a designated broadcast server. The foregoing embodiment wherein the designated broadcast server serves as an ingress mesh interface for broadcast packets entering the self-organizing network. The foregoing embodiment wherein interface nodes other than the designated broadcast server drop broadcast packets destined for any node of the self-organizing network. The foregoing embodiment further comprising forwarding a unicast packet from the shared access network to the self-organizing network. The foregoing embodiment wherein if the network interface nodes lack state for the destination of the unicast packet, then the designated broadcast server floods the unicast packet onto the self-organizing network. The foregoing embodiment wherein the unicast packet is a first unicast packet and further comprising determining state for the destination of the first unicast packet in response to information received from forwarding a second unicast packet from the destination to the source. The foregoing embodiment wherein the forwarding of the second unicast packet is after the flood of the first unicast packet.

The first embodiment wherein the group of interface nodes is operated as a gateway group identified by a shared gateway group identifier. The foregoing embodiment wherein a designated broadcast server elected by the gateway group forwards broadcast packets from the shared access network to the self-organizing network.

The first embodiment further comprising, in an ingress mesh network gateway interface node, inserting a list of egress mesh network gateway interface nodes into a control field of a broadcast packet before forwarding the broadcast packet onto the self-organizing network. The foregoing embodiment wherein the list comprises one entry per shared access network in communication with the self-organizing network. The foregoing embodiment wherein each respective entry corresponds to a best route from the ingress mesh network interface node to the shared access network reachable via the egress mesh network gateway interface node identified by the respective entry.

The first embodiment wherein a member of the group of interface nodes forwards a broadcast packet from the self-organizing network onto the shared access network if the broadcast packet header lists the member. The foregoing embodiment wherein a designated broadcast server is identified by the group of gateway interface nodes. The foregoing embodiment wherein if the forwarding member is distinct from the designated broadcast server, then before forwarding the broadcast packet, the forwarding member transmits a synchronization packet to the designated broadcast server. The foregoing embodiment wherein the synchronization packet notifies the designated broadcast server that the forwarding member is going to forward the broadcast packet onto the shared access network. The foregoing embodiment wherein the designated broadcast server, in response to the synchronization packet, omits forwarding the broadcast packet onto the self-organizing network. The foregoing embodiment wherein the broadcast packet header list is populated with one entry per shared access network in communication with the self-organizing network. The foregoing embodiment wherein an ingress mesh network gateway interface node populates the broadcast packet header list. The foregoing embodiment wherein each member of the broadcast packet header list corresponds to a best route from the ingress mesh network gateway interface node to the shared access network reachable via the node identified by the respective list member.

The first embodiment further comprising forwarding a broadcast packet from the self-organizing network to the shared access network. The foregoing embodiment wherein the forwarding of the broadcast packet is via a forwarding node, and the forwarding node records that the broadcast packet source is local to the self-organizing network. The foregoing embodiment wherein all network interface nodes except the forwarding node process the broadcast packet as if it were local to the shared access network. The foregoing embodiment wherein the processing is at least in part in response to the forwarding node record.

The first embodiment wherein the shared access network is a first shared access network, the group of network interface nodes is a first group of network interface nodes, and further comprising communicating packet data between the first shared access network and a second shared access network via one of the first group of network interface nodes and one of a second group of network interface nodes, the second group of network interface nodes being members of the self-organizing network and having respective communication links with the second shared access network. The foregoing embodiment wherein a unicast packet received by the one of the first group of network interface nodes is forwarded to the one of the second group of network interface nodes if the unicast packet is destined for the second shared access network. The foregoing embodiment wherein the one of the second group of interface nodes is on the best path from the one of the first group of network interface nodes to the second shared access network.

The first embodiment further comprising forwarding a unicast packet from the self-organizing network onto the shared access network. The foregoing embodiment wherein the unicast packet forwarding is via a forwarding member of the network interface group. The foregoing embodiment wherein the forwarding member records that the unicast packet source is local to the self-organizing network. The foregoing embodiment wherein members of the group of network interface nodes other than the forwarding member process the unicast packet as if it were local to the shared access network.

The first embodiment further comprising forwarding a unicast packet from the shared access network to a destination in or reachable through the self-organizing network. The foregoing embodiment wherein the forwarding of the unicast packet is via a network interface node that previously recorded the destination as being in or reachable through the self-organizing network. The foregoing embodiment wherein the network interface node that previously recorded the destination recorded the destination in association with forwarding a previous unicast or broadcast packet from the self-organizing network to the shared access network.

A second embodiment having all of the elements of the first embodiment further comprising allocating an endpoint in the shared access network as a mesh server; and in each of the network gateway interface nodes, communicating the packet data via a respective point-to-point link established with the mesh server. The foregoing embodiment wherein all of the packet data directed from the self-organizing network to the shared access network is routed via the mesh server. The second embodiment wherein all of the packet data directed from the shared access network to the self-organizing network is routed via the mesh server.

A third embodiment having all of the elements of the first embodiment wherein each of the network interface nodes operates as a respective physical network gateway interface; a node in the shared access network operates as a virtual network gateway interface; and the control protocol directs the communication of packet data to use the virtual network gateway interface as a terminus. The foregoing embodiment wherein all of the packet data directed from the self-organizing network to the shared access network is routed via the virtual network gateway interface. The third embodiment wherein all of the packet data directed from the shared access network to the self-organizing network is routed via the virtual network gateway interface. The third embodiment wherein all of the packet data between the shared access network and the self-organizing network is routed via the virtual network gateway interface.

Any of the first, second, and third embodiments wherein at least a portion of the self-organizing network operates as at least one of a wireless network and a wired network. Any of the first, second, and third embodiments wherein at least a wireless portion of the self-organizing network operates as a wireless network and a wired portion of the self-organizing network operates as a wired network. Any of the first, second, and third embodiments wherein at least a portion of the self-organizing network is an ad hoc network. Any of the first, second, and third embodiments wherein at least a portion of the self-organizing network is a mesh network. Any of the first, second, and third embodiments wherein at least a portion of the self-organizing network operates according to an 802.11 compatible wireless communication protocol.

A fourth embodiment of a computer readable medium having a set of instructions stored therein which when executed by a processing element causes the processing element to perform processes comprising any of the first, second, and third embodiments.

A fifth embodiment of a system comprising a processor and a memory adapted to store instructions to be executed by the processor, the instructions implementing any of the first, second, and third embodiments.

A sixth embodiment of system comprising a means for identifying a node in a shared access network as a mesh server; a means for forwarding traffic between a wireless mesh network and the shared access network via at least one of a plurality of gateway mesh nodes and the mesh server, the gateway mesh nodes enabled to operate in the wireless mesh network; and wherein the means for forwarding comprises a means for transit via a respective virtual mesh link associated with each of the gateway mesh nodes.

A seventh embodiment of a method comprising identifying a node in a shared access network as a mesh server; forwarding traffic between a wireless mesh network and the shared access network via at least one of a plurality of gateway mesh nodes and the mesh server; operating the gateway mesh nodes in the wireless mesh network; and wherein the forwarding comprises transiting via a respective virtual mesh link associated with each of the gateway mesh nodes.

An eighth embodiment of a system comprising a shared access network; a server node comprised in the shared access network; wherein the shared access network is enabled to select the server node from among a plurality of nodes comprised in the shared access network; and wherein the server node is enabled to forward traffic between a wireless mesh network and the shared access network at least in part via at least one of a plurality of gateway nodes of the wireless mesh network, and further at least in part via a respective virtual link associated with each of the gateway nodes.

A ninth embodiment of a system comprising a wireless mesh network; a gateway node comprised in the wireless mesh network; and wherein the gateway node is enabled to forward traffic between a shared access network and the wireless mesh network at least in part via at least one server node comprised in the shared access network, and further at least in part via a virtual link enabled to communicate with the gateway node.

A tenth embodiment of a computer readable medium having a set of instructions stored therein which when executed by a processing element causes the processing element to perform functions comprising selecting a server node from a plurality of nodes of a shared access network; and controlling forwarding of traffic between a wireless mesh network and the shared access network via at least one of a plurality of gateway nodes of the wireless mesh network, and further at least in part via a respective virtual link associated with each of the gateway nodes.

An eleventh embodiment of a system comprising means for identifying a group of nodes operating in a wireless mesh network as a gateway group to communicate with a shared access network, each of the gateway group nodes enabled to access a respective wired link to communicate with the shared access network and a respective wireless link to communicate within the wireless mesh network; in the gateway group, means for selecting one of the nodes of the gateway group as a designated broadcast server; in the designated broadcast server, means for forwarding broadcast packets from the shared access network into the wireless mesh network; and in all the nodes of the gateway group except the designated broadcast server, means for ignoring broadcast packets from the shared access network.

A twelfth embodiment of a method comprising identifying a group of nodes operating in a wireless mesh network as a gateway group to communicate with a shared access network, each of the gateway group nodes enabled to access a respective wired link to communicate with the shared access network and a respective wireless link to communicate within the wireless mesh network; in the gateway group, selecting one of the nodes of the gateway group as a designated broadcast server; in the designated broadcast server, forwarding broadcast packets from the shared access network into the wireless mesh network; and in all the nodes of the gateway group except the designated broadcast server, ignoring broadcast packets from the shared access network.

A thirteenth embodiment of a system comprising a wireless mesh network; a plurality of nodes in the wireless mesh network enabled to operate as a group of gateway nodes, each node of the gateway group enabled to communicate with a shared access network via a respective wired link and further enabled to communicate within the wireless mesh network via a respective wireless link; wherein the gateway group is enabled to select a designated one of the nodes of the gateway group as a designated broadcast server; wherein the designated broadcast server is enabled to forward packets from the shared access network into the wireless mesh network; and wherein all of the nodes of the gateway group except the designated broadcast server are enabled to ignore broadcast packets from the shared access network.

A fourteenth embodiment of a system comprising means for identifying a first node in a first shared access network as a first mesh server; means for identifying a second node in a second shared access network as a second mesh server; means for forwarding traffic between the shared access networks via at least one of a plurality of gateway mesh nodes and the mesh servers, the gateway mesh nodes enabled to operate in a wireless mesh network; wherein the shared access networks are wired networks; wherein the means for forwarding comprises means for transit via a respective virtual mesh link associated with each of the gateway mesh nodes; wherein the virtual mesh links are implemented via respective point-to-point tunnels operating in part with respective wired links coupled to the first and the second mesh servers; wherein the mesh servers comprise respective means for tagging broadcast packets provided to the gateway mesh nodes; and wherein nodes of the wireless mesh network are enabled to examine at least some results of the means for tagging in part to eliminate redundant transmission of the broadcast packets.

A fifteenth embodiment of a method comprising identifying a first node in a first shared access network as a first mesh server; identifying a second node in a second shared access network as a second mesh server; forwarding traffic between the shared access networks via at least one of a plurality of gateway mesh nodes and the mesh servers, the gateway mesh nodes operating in a wireless mesh network; wherein the shared access networks are wired networks; wherein the forwarding comprises transit via a respective virtual mesh link associated with each of the gateway mesh nodes; wherein the virtual mesh links are implemented via respective point-to-point tunnels operating in part with respective wired links coupled to the first and the second mesh servers; wherein the mesh servers tag broadcast packets provided to the gateway mesh nodes; and wherein nodes of the wireless mesh network examine at least some results of the tagging in part to eliminate redundant transmission of the broadcast packets.

A sixteenth embodiment of a system comprising means for identifying a first group of nodes operating in a wireless mesh network as a first gateway group to communicate with a first shared access network, each of the first gateway group nodes enabled to access a respective wired link to communicate with the first shared access network and a respective wireless link to communicate within the wireless mesh network; means for identifying a second group of nodes operating in the wireless mesh network as a second gateway group to communicate with a second shared access network, each of the second gateway group nodes enabled to access a respective wired link to communicate with the second shared access network and a respective wireless link to communicate within the wireless mesh network; means for forwarding traffic from the first shared access network to the second shared access network via the gateway groups, the means for forwarding comprising via one of the nodes of the first gateway group enabled to operate as an ingress node, means for forwarding the traffic from the first shared access network onto the wireless mesh network, in the wireless mesh network, means for forwarding the traffic, according to a transit path, from the ingress node to one of the nodes of the second gateway group enabled to operate as an egress node, and in the egress node, means for forwarding the traffic from the wireless mesh network onto the second shared access network; wherein the shared access networks are wired networks; wherein the egress node is selected in part based on a best egress path; wherein the transit path is selected in part based on a best transit path; wherein the first gateway group nodes all share a common first gateway group identifier; and wherein the second gateway group nodes all share a common second gateway group identifier.

A seventeenth embodiment of a method comprising identifying a first group of nodes operating in a wireless mesh network as a first gateway group to communicate with a first shared access network, each of the first gateway group nodes enabled to access a respective wired link to communicate with the first shared access network and a respective wireless link to communicate within the wireless mesh network; identifying a second group of nodes operating in the wireless mesh network as a second gateway group to communicate with a second shared access network, each of the second gateway group nodes enabled to access a respective wired link to communicate with the second shared access network and a respective wireless link to communicate within the wireless mesh network; forwarding traffic from the first shared access network to the second shared access network via the gateway groups, the forwarding comprising via one of the nodes of the first gateway group operating as an ingress node, forwarding the traffic from the first shared access network onto the wireless mesh network, in the wireless mesh network, forwarding the traffic, according to a transit path, from the ingress node to one of the nodes of the second gateway group operating as an egress node, and in the egress node, forwarding the traffic from the wireless mesh network onto the second shared access network; wherein the shared access networks are wired networks; wherein the egress node is selected in part based on a best egress path; wherein the transit path is selected in part based on a best transit path; wherein the first gateway group nodes all share a common first gateway group identifier; and wherein the second gateway group nodes all share a common second gateway group identifier.

An eighteenth embodiment of a system comprising means for communicating packet data between a self-organizing network and a shared access network via a group of network interface nodes, each interface node being a member of the self-organizing network and having access to a respective communication link with the shared access network; means for executing a control protocol to enable network performance improvements; and wherein the network performance improvements comprise at least one of preventing broadcast loops between the self-organizing network and the shared access network, avoiding forwarding of more than one copy of a packet from the shared access network onto the self-organizing network, and routing a packet that specifies a source and a destination via a best path within the self-organizing network according to the source and the destination.

A nineteenth embodiment of a method comprising communicating packet data between a self-organizing network and a shared access network via a group of network interface nodes, each interface node being a member of the self-organizing network and having access to a respective communication link with the shared access network; executing a control protocol to enable network performance improvements; and wherein the network performance improvements comprise at least one of preventing broadcast loops between the self-organizing network and the shared access network, avoiding forwarding of more than one copy of a packet from the shared access network onto the self-organizing network, and routing a packet that specifies a source and a destination via a best path within the self-organizing network according to the source and the destination.

A twentieth embodiment of a computer readable medium having a set of instructions stored therein which when executed by a processing element causes the processing element to perform functions comprising selecting a node of a group of interface nodes to operate as a designated broadcast server, the selecting being part of a distributed protocol communicating control information between the group of interface nodes; selectively forwarding broadcast packets from a shared access network into a wireless mesh network; selectively ignoring broadcast packets from the shared access network; wherein the group of interface nodes are enabled to operate in the wireless mesh network via a respective wireless link, and each of the interface nodes is enabled to communicate with the shared access network via a respective communication link; wherein the selectively forwarding is via the designated broadcast server; and wherein the selectively ignoring is via all members of the group of interface nodes other than the designated broadcast server.

A twenty-first embodiment of a system comprising a plurality of wireless nodes enabled to operate in a wireless mesh network, each of the wireless nodes comprising a processing element enabled to execute instructions obtained from a respective computer readable medium; a plurality of wired links enabled to couple a subset of the wireless nodes to at least one shared access network; wherein a first portion of the instructions is to be executed to select a node of the subset to operate as a designated broadcast server, the selecting according to a distributed protocol that comprises exchanging control information between the nodes of the subset; wherein a second portion of the instructions is to be executed by the designated broadcast server to control selectively forwarding broadcast packets from the at least one shared access network to the wireless mesh network; and wherein a third portion of the instructions is to be executed by all the nodes of the subset except the designated broadcast server to control selectively ignoring the broadcast packets.

Multiple Shared Network Access Gateway Group Architecture

Redundant and load-balanced access between a mesh and each of one or more shared access networks is provided, in the first architecture, by a respective group of NGIs operating as a gateway group. One of the NGIs in each of the respective gateway groups is elected, by elements of the gateway group, to operate as a Designated Broadcast Server (DBS). The DBS is the only node within the respective gateway group enabled to forward broadcast packets from the respective shared access network to the mesh.

FIG. 1 illustrates selected details of an embodiment of the first architecture of a mesh network having multiple mesh gateway interfaces to multiple shared access networks. Each of MN1-4 102.1-4 and MN6-7 102.6-7 are mesh nodes operating as NGIs that are members of illustrated Mesh Network 100. MN1 and MN2 are operated as Gateway Group 1 103.1 to provide any combination of redundant and load-balanced access to shared access network Subnet A 101.A (operating as Broadcast Domain 1). Similarly MN3 and MN4 operate as Gateway Group 2 103.2 with Subnet B 101.B of Broadcast Domain 2, and MN6 and MN7 operate as Gateway Group3 103.3 with Subnet C 101.C of Broadcast Domain 3. Gateway groups may include any number of NGIs (such as three, four, or more), and any number of shared access networks may be accessible from a single mesh network via a corresponding number of gateway groups.

Members of a gateway group (such as MN1 and MN2 of Gateway Group 1) are identified as belonging to the same shared access network (such as Subnet A having Broadcast Domain 1), and thus an element of the mesh (or an element enabled for communication via the mesh) may consider any member of the gateway group as an alternate NGI for communication with the shared access network. All NGIs of each respective gateway group are assigned an ID that is the same for all elements of the respective gateway group but unique with respect to other gateway groups (such as MN1 and MN2 being assigned ID "1", and MN3 and M4 being assigned ID "2", and so forth). Gateway group information is distributed as part of configuring the mesh in some embodiments. Gateway group information is determined via an autoconfiguration protocol in some embodiments.

Election of a DBS for each respective gateway group addresses issues described with respect to Mesh Network Concepts Nos. 1 and 2, described elsewhere herein. The NGIs of each respective gateway group elect a respective DBS among themselves via a distributed protocol. Each respective DBS serves to allow broadcast packets into the mesh from each respective shared access network. All other NGIs of the respective gateway group drop all broadcast packets received from the respective shared access network.

Figure 2A:
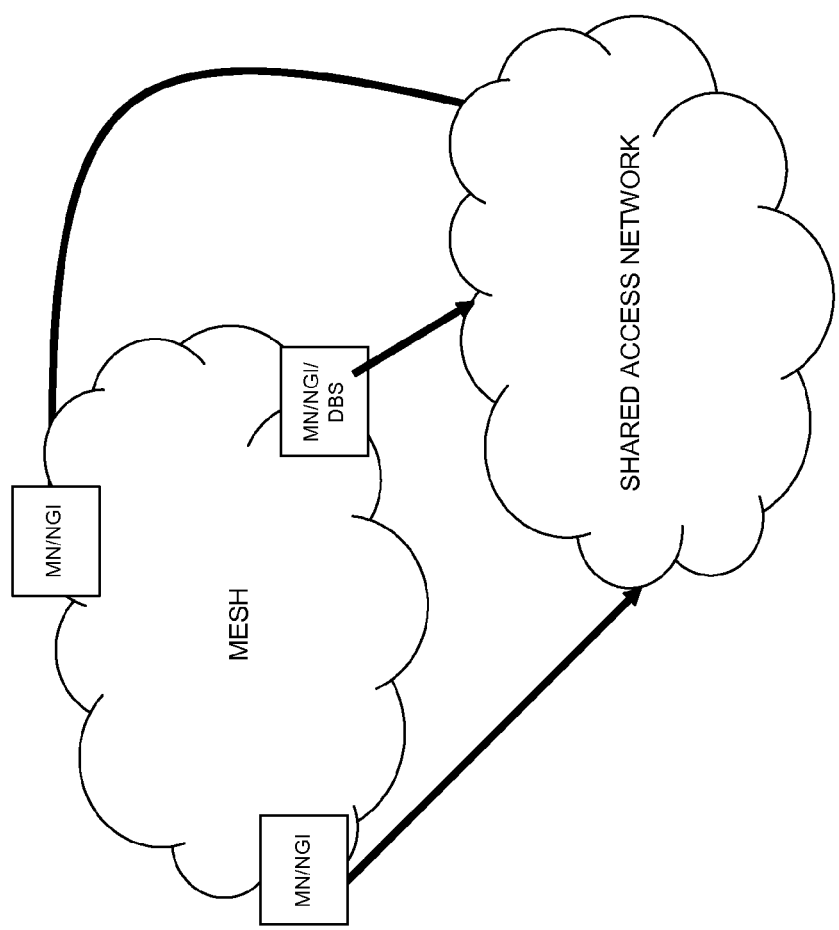
Figure 2C:
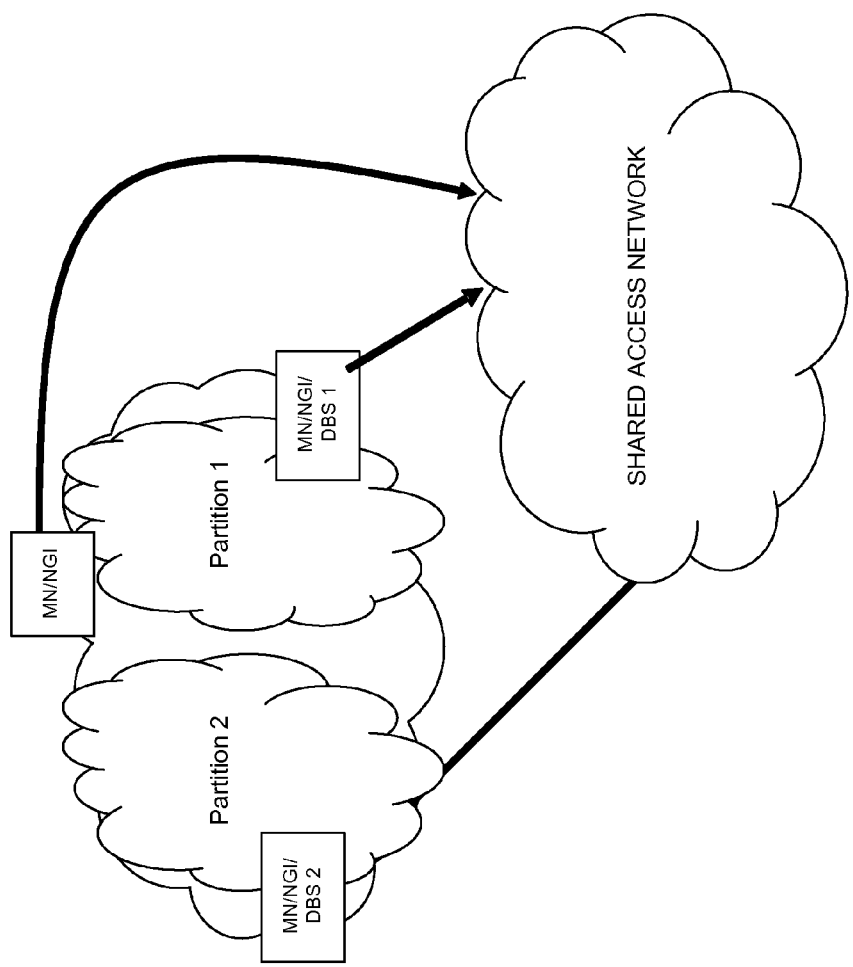

FIGS. 2A, 2B, and 2C illustrate selected details of an embodiment of a self-healing mesh network having a control protocol for assigning a DBS in each of one or more partitions of the mesh network. Illustrated mesh network Mesh 210 having mesh network nodes MN/NGI 211, MN/NGI 212, and MN/NGI/DBS 213 is enabled for communication with Shared Access Network 220. Currently operational DBS 213 is indicated in FIG. 2A by the notation MN/NGI/DBS, indicating that the Mesh Node (MN) so annotated is both an NGI and a DBS.

FIG. 2B illustrates that if DBS 213 of FIG. 2A (or the link to the shared access network of the DBS) fails, a new DBS (MN/NGI/DBS (NEW) 212) is elected by a control protocol that uses a combination of static and dynamic selection algorithms. Any NGI may act as a DBS. In some usage scenarios, at any given time there is only one DBS active in a Gateway group. However, in situations when a mesh is partitioned into two or more disjoint networks (with NGIs for the same shared access network present in each partition) having only one DBS leads to some partitions not being able to transport any broadcast messages. A solution is to have one DBS active for each such disjoint partition of the mesh.

FIG. 2C illustrates that failed DBS 213 of FIG. 2B has recovered but with the mesh partitioned in two portions, each having at least one NGI and DBS. The control protocol has elected a DBS for each mesh partition as indicated by the annotation MN/NGI/DBS1 of 213 for partition 1 221.1, and MN/NGI/DBS2 of 212 for partition 2 221.2.

Once the disjoint partitions join back together, only one DBS remains active. For example, the network may return to the situation illustrated by FIG. 2A. All NGIs in a gateway group actively participate in selection and decommissioning of the DBS NGIs to handle failures and partitions without any user intervention, thus maintaining the self-healing nature of the mesh network.

Packet Forwarding and Route Selection

In the Multiple Shared Network Access Architecture Processing of Broadcast Packets:

Broadcast Packet Aspect No. 1: In selected embodiments, the DBS within a gateway group forwards a broadcast packet originated on the shared access network into the mesh, thus serving as the Ingress Mesh Interface for the packet.

Broadcast Packet Aspect No. 2: Before forwarding the broadcast packet, the Ingress Mesh NGI attaches to the packet a list of Egress Mesh NGIs, one per mesh-attached shared access network. Each Egress Mesh NGI in the list corresponds to the best route from the Ingress Mesh NGI to the shared access network the respective Egress Mesh NGI provides communication with. Stated another way, for each mesh-attached shared access network, one Egress Mesh NGI is selected from among the Egress Mesh NGIs coupled to the respective shared access network, such that the selected Egress Mesh NGI is the best route from the Ingress Mesh NGI to the respective shared access network. Information on paths and the metric of each path is available through the routing protocol, that at each node keeps track of the best routes to all other nodes in the mesh.

Broadcast Packet Aspect No. 3: A mesh NGI only forwards a broadcast packet from the mesh onto the shared access network if the mesh NGI is listed in the header of the packet. If the mesh NGI is not the DBS for the gateway group, then before forwarding the packet into the shared access network, an Egress NGI sends a synchronization packet to the DBS NGI for the mesh NGI providing notification of forwarding of a broadcast packet onto the shared access network so that the DBS does not assume the packet was sent on the shared access network and needs to be forwarded onto the mesh. Thus the broadcast packet follows the best path from an Ingress Mesh NGI to each shared access network and no broadcast loops are formed (addressing issues raised in Mesh Network Concept No. 1).

Broadcast Packet Aspect No. 4: When a broadcast is forwarded by a mesh NGI onto a shared access network, the NGI forwarding it records that the packet source is local to the mesh, while all other NGIs overhear the packet and assume that the source of the packet is local to the shared access network. In some embodiments the recording of the packet source as local to the mesh occurs when the packet source is in the mesh and also when the packet source is reachable through the mesh. As a result, when a packet is subsequently sent to the same node, only one NGI forwards the packet into the mesh and communication between a given source and destination is symmetric. In other words, the same path is used for packets from the source to the destination and vice versa.

Processing of Unicast Packets:

Unicast Packet Aspect No. 1: A unicast packet is received at a Mesh Ingress Client Interface/NGI. If the destination node is in a shared access network that is associated with a Gateway Group, then the packet is forwarded to the NGI that is part of the Gateway group and has the least cost from the ingress node with respect to all NGIs belonging to the Gateway Group. The least cost forwarding tends to conserve wireless bandwidth and improves overall mesh performance.

Unicast Packet Aspect No. 2: When a unicast packet is forwarded onto the shared access network from a mesh, the forwarding NGI records that the packet source is local to the mesh, while all other NGIs overhear the packet and assume that the source of the packet is local to the shared access network. In some embodiments the recording of the packet source as local to the mesh occurs when the packet source is in the mesh and also when the packet source is reachable through the mesh. As a result, when a packet is subsequently sent to that same node, only one NGI forwards the packet into the mesh and communication between a given source and destination is symmetric, i.e., the same path is used for packets from the source to the destination and vice versa.

Unicast Packet Aspect No. 3: When a unicast packet is originated on the shared access network, and the mesh NGIs have state for the destination of the packet (e.g., through Unicast Packet Scenario No. 1 or through Broadcast Packet Scenario No. 4), the one mesh NGI that has recorded the destination as being a mesh destination forwards the packet into the mesh. The forwarding is directed to the closest Egress Mesh NGI within the gateway group of the shared access network where the packet is destined.

Unicast Packet Aspect No. 4: When a unicast packet is originated on the shared access network, and the mesh NGIs do not have state for the destination of the packet (e.g., the state was not used for a while and expired), the DBS floods the packet into the mesh. Eventually, as a result of packets sent in the other direction, the state for how to reach the destination will be relearned, and packets will start being delivered through unicast within the mesh as in Unicast Packet Scenario No. 3.

Multiple Shared Network Access Mesh Server Architecture

Figure 3:
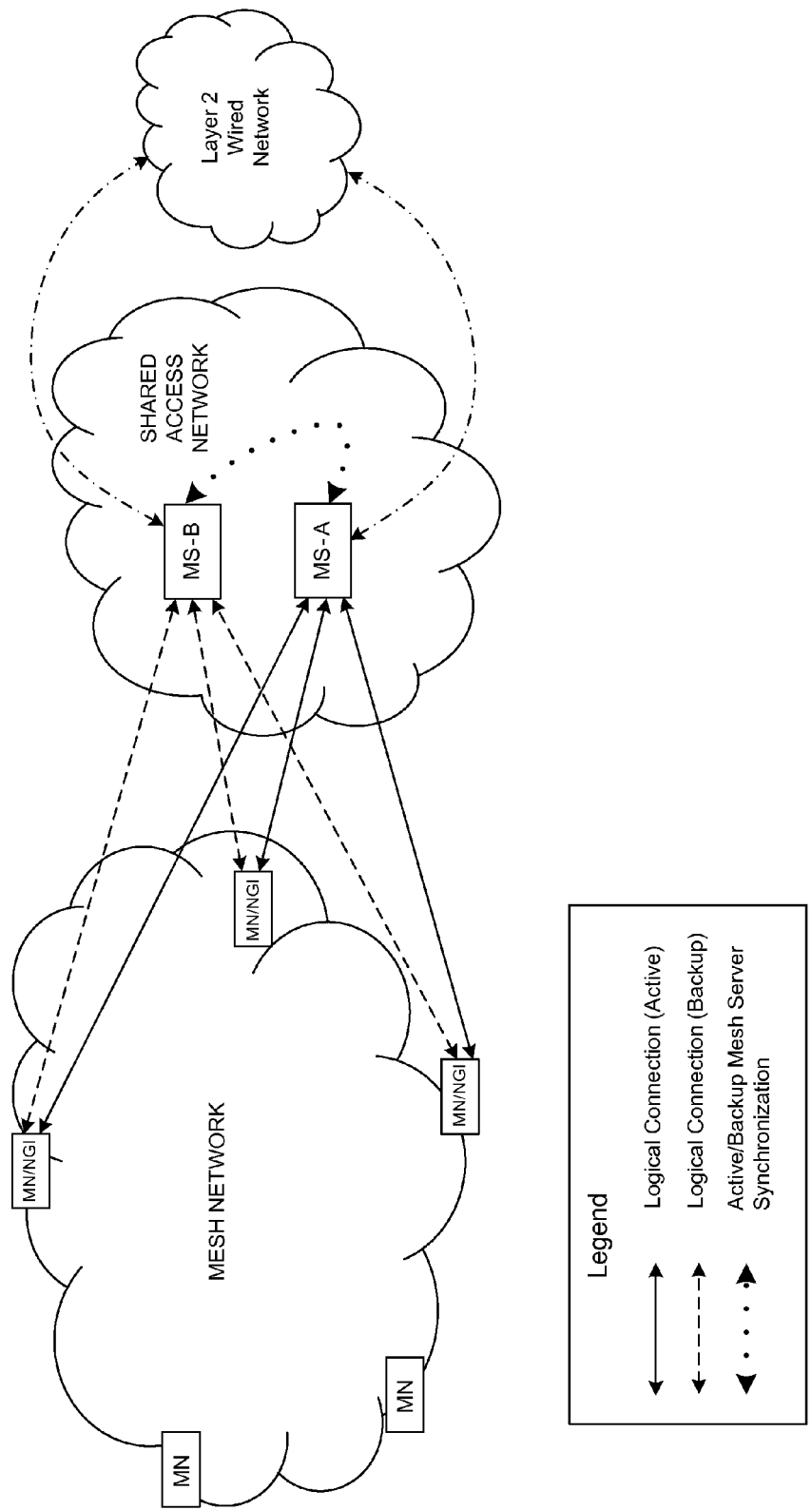
FIG. 3 illustrates selected details of an embodiment of a second architecture of a mesh network having multiple mesh gateway interfaces to a common shared access network.

FIG. 3 illustrates selected details of an embodiment of the second architecture of a mesh network having multiple mesh gateway interfaces to a common shared access network. In the second architecture, multiple mesh NGIs are connected to a common shared access network while preserving best path routing within the mesh at all times.

Mesh Network 310 is illustrated with a plurality of mesh nodes, including mesh nodes participating in the mesh as MNs 311 and 312, and mesh nodes participating in the mesh and operating as NGIs as MN/NGIs 313-315. The mesh network is enabled for communication with Shared Access Network 320. The shared access network includes mesh servers MS-A 321.A and MS-B 321.B enabled for communication with Layer 2 Wired Network 330 via Wired Links 370.A-B. Also illustrated are (Active) Logical Connections 340.1-3, (Backup) Logical Connections 350.1-3, and Active/Backup Mesh Server Synchronization 360.

Rather than employing coordination protocols between the mesh NGIs, the second architecture employs an additional node in the shared access network, referred to as a Mesh Server (MS), such as "MS-A" 321.A, illustrated. The additional node is coupled to the mesh via a wired connection, and acts as a virtual NGI, executing a mesh routing protocol. The devices physically connected to both the mesh and the shared access network operate as mesh nodes having virtual mesh links to the virtual mesh NGI. The virtual mesh links may be implemented as point-to-point tunnels. In some embodiments the virtual mesh NGI is collocated on a device also having a physical NGI.

Employing one virtual mesh NGI forces packets entering and exiting the mesh to always enter and exit the mesh at one point, thus preventing broadcast loops (Mesh Network Concept No. 1). The single mesh entry/exit point also ensures that only one copy of each packet enters the mesh (Mesh Network Concept No. 2). For broadcast or flooded packets, the virtual NGI sends a copy of the packet along each of the links to the physical mesh NGIs across the virtual mesh links. However, at the point where the packet is transmitted on a mesh link, the packet includes control information that enables forwarding nodes to detect duplicate copies of the packet. Thus even though a broadcast packet may enter the mesh through multiple physical mesh NGIs, each node in the mesh would only forward a single copy of the packet.

Since all the NGIs are part of the mesh in embodiments based on the second architecture, the routing protocol may determine the best paths from a virtual NGI in one access network to a virtual NGI in any other access network, thus addressing Mesh Network Concept No. 3.

In some embodiments a pair of MSs are used to provide redundancy, with a first additional node of the pair operating as an active node (such as "MS-A" 321.A, illustrated) and a second additional node of the pair operating as a backup node (such as "MS-B" 321.B, illustrated). In some embodiments synchronization processing is employed between the active and backup MSs (such as "Active/Backup Mesh Server Synchronization" 360, illustrated).

Embodiments in accordance with the second architecture may provide for concurrent access to a plurality of shared access networks. Each of the shared access networks includes one or more MSs. MN/NGI nodes communicate with one or more shared access networks via at least one MS that is a member of the respective shared access network. For example, to communicate with two shared access networks, a first virtual link is established from a first MN/NGI to a first MS that is a member of a first of the two shared access networks. A second virtual link is established from a second MN/NGI to a second MS that is a member of the second of the two shared access networks.

Node Hardware and Software

Figure 4:
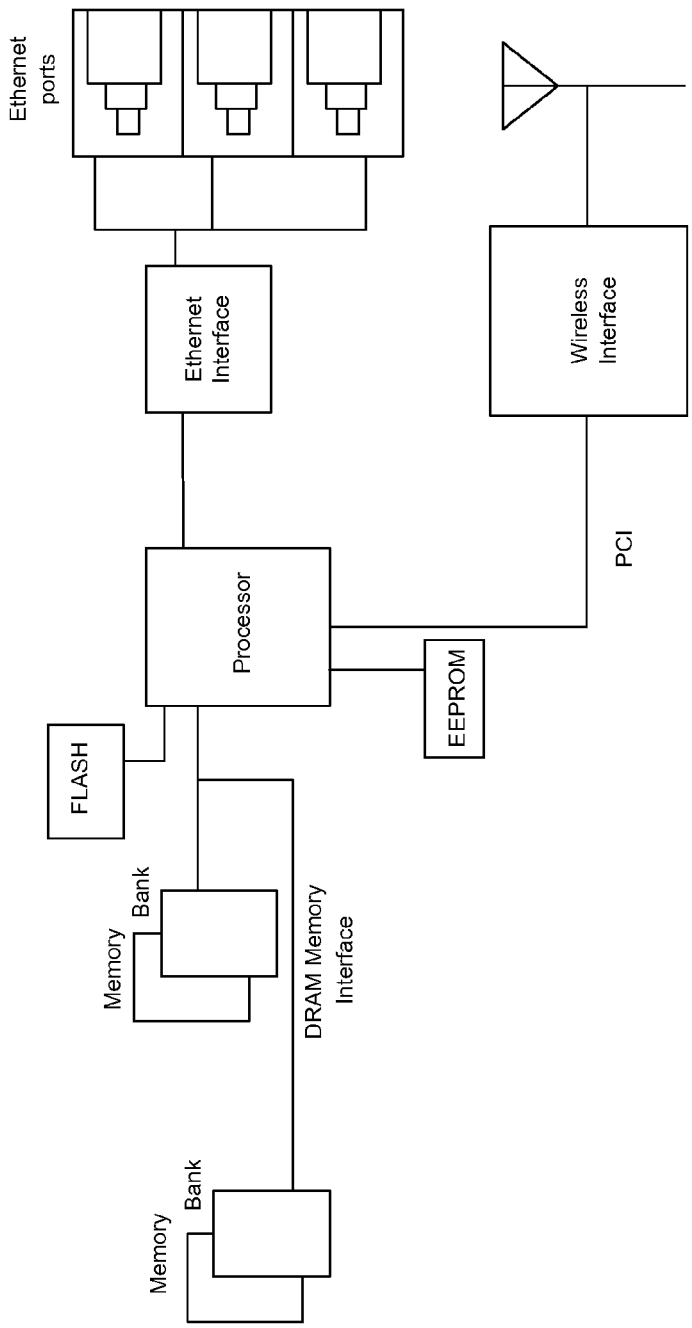
FIG. 4 illustrates selected details of hardware aspects of an embodiment of a node.

FIG. 4 illustrates selected details of hardware aspects of an embodiment of a node. The illustrated node includes Processor 405 coupled to various types of storage, including volatile read/write memory "Memory Bank" elements 401.1-2 via DRAM Memory Interface 402, and non-volatile read/write memory FLASH 403 and EEPROM 404 elements. The processor is further coupled to Ethernet Interface 406 providing a plurality of Ethernet Ports 407 for establishing wired links, and Wireless Interface 409 providing radio communication of packets for establishing wireless links. In some embodiments the Wireless Interface is compatible with an IEEE 802.11 wireless communication standard (such as any of 802.11a, 802.11b, and 802.11g). In some embodiments the Wireless Interface operates (in conjunction with any combination of hardware and software elements) to collect statistics with respect to neighboring nodes of a mesh. The statistics may include any combination of signal strength and link quality. In some embodiments the Wireless Interface is configurable to drop all packets below a settable Received Signal Strength Indicator (RSSI) threshold. The illustrated partitioning is only one example, as other equivalent embodiments of a node are possible.

The illustrated node may function as any one of the mesh nodes illustrated in FIGS. 1, 2A, 2B, 2C, and 3 (for example any of MN1-8, any node designated as MN/NGI, and any node designated as MNG/NGI/DBS). The Wireless Interface of FIG. 4 may enable communication between nodes and provide low-level transport for packets moving between elements of the mesh and one or more shared access networks. The Ethernet ports of FIG. 4 may provide for wired communication between a node operating as an NGI and an associated shared access network (e.g. any of the couplings between MN1-2 and Subnet A, between MN3-4 and Subnet B, and between MN6-7 and Subnet C of FIG. 1).

In operation the processor fetches instructions from any combination of the storage elements (DRAM, FLASH, and EEPROM) and executes the instructions. In the context of the first architecture, some of the instructions correspond to execution of software associated with operations relating to processing as a member of a gateway group. The operations include the distributed protocol implementing election of a DBS and further include subsequent filtering/passing of broadcast packets. The operations further include processing relating to any combination of redundancy and load-balancing. Gateway group identification information may be stored in any combination of the storage elements according to instructions executed during processing associated with mesh set up and initialization. In the context of the second architecture, some of the instructions correspond to execution of software associated with operations relating to interfacing to one or more mesh MSs, including redundancy and load-balancing functions.

Figure 5:
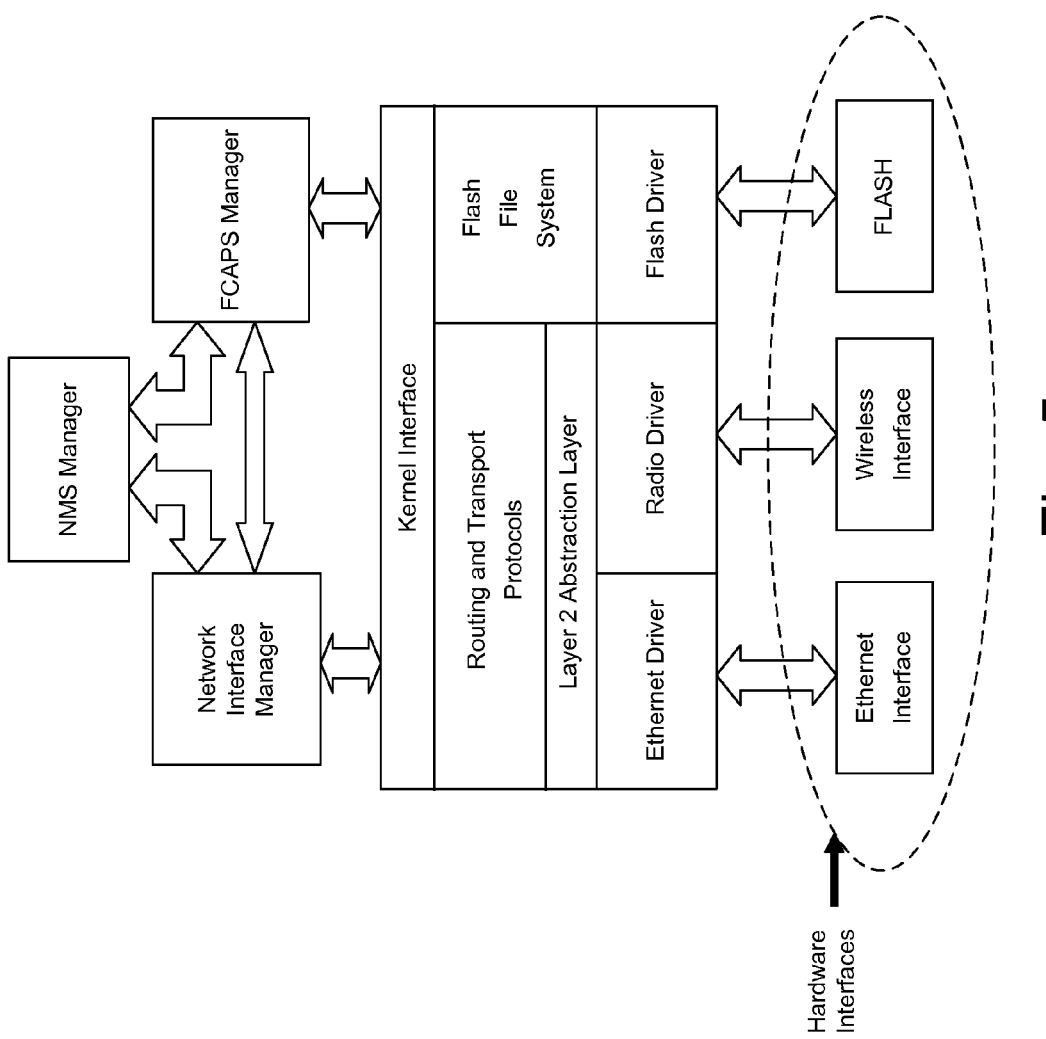
FIG. 5 illustrates selected details of software aspects of an embodiment of a node.

FIG. 5 illustrates selected details of software aspects of an embodiment of a node. The illustrated software includes Network Management System (NMS) Manager 501 interfacing to Network Interface Manager 502 and Fault, Configuration, Accounting, Performance, and Security (FCAPS) Manager 503. In some embodiments the NMS interfaces between management software operating external to the node and software operating internal to the node (such as various applications and FCAPS). The Network Interface Manager manages physical network interfaces (such as the Ethernet and Wireless Interfaces of a node). The Network Interface Manager assists the NMS in passing dynamic configuration changes (as requested by a user) through the management software to FCAPS. In some embodiments FCAPS includes functions to store and retrieve configuration information, and FCAPS functions serve all applications requiring persistent configuration information. FCAPS may also assist in collecting fault information and statistics and performance data from various operating modules of the node. FCAPS may pass any portion of the collected information, statistics, and data to the NMS.

Kernel Interface 510 interfaces the Managers to Routing and Transport Protocols layer 511 and Flash File System module 513. The Routing Protocols include portions of processing relating to operation as a member of a gateway group or interfacing to MSs, according to architecture, as well as general processing relating to operation as a node of the mesh and forwarding packets. The Transport Protocols include TCP and UDP. The Flash File System module interfaces to Flash Driver 516 that is illustrated conceptually coupled to FLASH hardware element 523 that is representative of a flash file system stored in any combination of the FLASH and EEPROM elements of FIG. 4. Layer-2 Abstraction Layer 512 interfaces the Routing and Transport Protocols to Ethernet and Radio Drivers 514 and 515, respectively. The Ethernet Driver is illustrated conceptually coupled to Ethernet Interface 526 that is representative of the Ethernet Interface of FIG. 4. The Radio Driver is illustrated conceptually coupled to Wireless Interface 529 that is representative of the Wireless Interface of FIG. 4. In some embodiments the software may also include a serial driver. The software is stored on a computer readable medium (e.g. any combination of the DRAM, FLASH, and EEPROM elements), and is executed by the processor. The illustrated partitioning is an example only, as many other equivalent arrangements of layers are possible.

CONCLUSION

Although the foregoing embodiments have been described in some detail for purposes of clarity of understanding, the invention is not limited to the details provided. There are many alternative ways of implementing the invention. The disclosed embodiments are illustrative and not restrictive. It will be understood that many variations in construction, arrangement and use are possible consistent with the teachings and within the scope of the claims appended to the issued patent. For example, interconnect and function-unit bit-widths, clock speeds, and the type of technology used may generally be varied in each component block. The order and arrangement of flowchart and flow diagram process and function elements may generally be varied. Also, unless specifically stated to the contrary, the value ranges specified, the maximum and minimum values used, or other particular specifications (such as integration techniques and design flow technologies), are merely those of the illustrative embodiments, can be expected to track improvements and changes in implementation technology, and should not be construed as limitations.

Functionally equivalent techniques known to those of ordinary skill in the art may be employed instead of those illustrated to implement various components, sub-systems, functions, operations, routines, and sub-routines. The names given to interconnect, logic, functions, and routines are merely illustrative, and should not be construed as limiting the concepts taught. It is also understood that many design functional aspects may be carried out in either hardware (i.e., generally dedicated circuitry) or software (i.e., via some manner of programmed controller or processor), as a function of implementation dependent design constraints and the technology trends of faster processing (which facilitates migration of functions previously in hardware into software) and higher integration density (which facilitates migration of functions previously in software into hardware). Specific variations may include, but are not limited to: differences in networking technology (such as wired/wireless, protocols, and bandwidths); and other variations to be expected when implementing the concepts taught herein in accordance with the unique engineering and business constraints of a particular application.

The embodiments have been illustrated with detail and environmental context well beyond that required for a minimal implementation of many of aspects of the concepts taught. Those of ordinary skill in the art will recognize that variations may omit disclosed components without altering the basic cooperation among the remaining elements. It is thus understood that much of the details disclosed are not required to implement various aspects of the concepts taught. To the extent that the remaining elements are distinguishable from the prior art, omitted components are not limiting on the concepts taught herein.

All such variations in design comprise insubstantial changes over the teachings conveyed by the illustrative embodiments. It is also understood that the concepts taught herein have broad applicability to other networking and communication applications, and are not limited to the particular application or industry of the illustrated embodiments. The invention is thus to be construed as including all possible modifications and variations encompassed within the scope of the claims appended to the issued patent.

What is claimed is:

1. A system comprising:
   means for communicating packet data between a self-organizing network and a same shared access network via a group of network interface nodes, each node being a member of the self-organizing network and having a respective communication link with the same shared access network;
   means for executing a control protocol to enable network performance improvements;
   wherein the network performance improvements comprise at least one of
      preventing broadcast loops between the self-organizing network and the same shared access network,
      avoiding forwarding of more than one copy of a packet from the same shared access network onto the self-organizing network, and
      routing a packet that specifies a source and a destination via a best path within the self-organizing network according to the source and the destination; and
   wherein a particular one of the nodes in the self-organizing network is operated as a first endpoint, a particular endpoint accessible via the shared-access network is operated as a second endpoint, and the communicating comprises splitting traffic communicated between the first endpoint and the second endpoint between a plurality of the communication links.

2. The system of claim 1, wherein the splitting traffic is in accordance with a load-balancing objective.

3. The system of claim 1, wherein the means for communicating is in accordance with a means for failure recovery comprising means for shifting traffic communicated between an endpoint in the self-organizing network and an endpoint accessible via the same shared access network from a first one of the communication links to a second one of the communication links when the first one of the communication links fails.

4. The system of claim 1, wherein:
   the group of network interface nodes is a gateway group, and each node of the group of network interface nodes is operable as a respective network gateway interface;
   the control protocol is a distributed control protocol executable on the gateway group; and
   the distributed control protocol enables communicating control information between the network gateway interfaces.

5. The system of claim 4, further comprising means for communicating data between the self-organizing network and another shared access network via another gateway group.

6. The system of claim 5, wherein each of the gateway groups are identified by unique respective gateway group identifiers.

7. The system of claim 1, further comprising:
   means for allocating an endpoint in the same shared access network as a mesh server; and
   in each of the network interface nodes, means for communicating the packet data via a respective point-to-point link established with the mesh server.

8. The system of claim 7, wherein the control protocol is executable by all nodes of the self-organizing network.

9. The system of claim 8, wherein the control protocol is enabled to control routing of packets within the self-organizing network.

10. The system of claim 1, wherein:
    each of the network interface nodes is operable as a respective physical network gateway interface;
    a node in the same shared access network is operable as a virtual network gateway interface; and
    the control protocol is enabled to direct the means for communicating to use the virtual network gateway interface as a terminus.

11. A method comprising:
    communicating packet data between a self-organizing network and a same shared access network via a group of network interface nodes, each node being a member of the self-organizing network and having a respective communication link with the same shared access network;
    executing a control protocol to enable network performance improvements;
    wherein the network performance improvements comprise at least one of
       preventing broadcast loops between the self-organizing network and the same shared access network,
       avoiding forwarding of more than one copy of a packet from the same shared access network onto the self-organizing network, and
       routing a packet that specifies a source and a destination via a best path within the self-organizing network according to the source and the destination; and
    wherein a particular one of the nodes in the self-organizing network is operated as a first endpoint, a particular endpoint accessible via the shared-access network is operated as a second endpoint, and the communicating comprises splitting traffic communicated between the first endpoint and the second endpoint between a plurality of the communication links.

12. The method of claim 11, wherein the splitting traffic is in accordance with a load-balancing objective.

13. The method of claim 11, wherein the communicating is in accordance with a failure recovery operation comprising shifting traffic communicated between an endpoint in the self-organizing network and an endpoint accessible via the same shared access network from a first one of the communication links to a second one of the communication links when the first one of the communication links fails.

14. The method of claim 11, wherein:
the group of network interface nodes is a gateway group, and each node of the group of network interface nodes operates as a respective network gateway interface;
the control protocol is a distributed control protocol executed on the gateway group; and
the distributed control protocol comprises communicating control information between the network gateway interfaces.

15. The method of claim 14, further comprising communicating data between the self-organizing network and another shared access network via another gateway group.

16. The method of claim 15, wherein each of the gateway groups are identified by unique respective gateway group identifiers.

17. The method of claim 11, further comprising:
allocating an endpoint in the same shared access network as a mesh server; and
in each of the network interface nodes, communicating the packet data via a respective point-to-point link established with the mesh server.

18. The method of claim 17, wherein the control protocol is executed by all nodes of the self-organizing network.

19. The method of claim 18, wherein the control protocol controls routing of packets within the self-organizing network.

20. The method of claim 11, wherein:
each of the network interface nodes is operable as a respective physical network gateway interface;
a node in the same shared access network is operable as a virtual network gateway interface; and
the control protocol is enabled to direct the means for communicating to use the virtual network gateway interface as a terminus.

* * * * *